United States Patent [19]

Giger

[11] 4,207,603
[45] Jun. 10, 1980

[54] SURGE PROTECTION OF FULL-WAVE RECTIFIER BY BIASED IONIZATION TUBE

[75] Inventor: Robert J. Giger, Mooresville, Ind.

[73] Assignee: RCA Corporation, New York, N.Y.

[21] Appl. No.: 949,062

[22] Filed: Oct. 6, 1978

[51] Int. Cl.² ............................................. H02H 3/20
[52] U.S. Cl. .................................... 361/56; 313/201; 361/91
[58] Field of Search ...................... 361/54, 55, 56, 88, 361/91, 110, 111, 120; 313/201

[56] References Cited
U.S. PATENT DOCUMENTS

| | | | |
|---|---|---|---|
| 2,129,524 | 9/1938 | Camilli | 361/56 X |
| 2,849,657 | 8/1958 | Nash et al. | 313/201 X |
| 2,947,913 | 8/1960 | Trostler | 313/201 X |
| 3,133,230 | 5/1964 | Glassburn | 361/111 X |
| 3,308,311 | 3/1967 | Swanson | 361/56 X |

*Primary Examiner*—Harry E. Moose, Jr.

*Attorney, Agent, or Firm*—Eugene M. Whitacre; Paul J. Rasmussen; William H. Meise

[57] ABSTRACT

A television receiver includes a full-wave rectifier and filter capacitor coupled to the A.C. power line for generating an unregulated direct operating voltage for the receiver. In order to provide a start-up voltage for certain portions of the receiver when the receiver is initially turned on, a transformer has a primary winding coupled between the rectifier and the filter capacitor which is responsive to the initial surge current in the capacitor. In order to protect the diodes of the rectifier from voltage surges which may enter the receiver from the A.C. line, a glow or ionization lamp is coupled across the primary of the start-up transformer. The glow lamps have unpredictable start-up voltages when operated in the dark interior of the receiver housing. The lamps are ionized independent of the presence of surges by coupling to the horizontal deflection circuit. With independent ionization of the glow lamp, the voltage drop and speed of response to surges is improved.

8 Claims, 3 Drawing Figures

SURGE PROTECTION OF FULL-WAVE RECTIFIER BY BIASED IONIZATION TUBE

BACKGROUND OF THE INVENTION

This invention relates to arrangements for protecting reverse-biased diodes of a full-wave bridge rectifier against power-line voltage surges by use of a biased ionization tube.

Electrically powered equipment is often energized with direct voltage obtained by rectification from the alternating-current power mains. Typically, such an equipment uses rectifiers to change alternating current into a pulsating unidirectional or direct current which is then applied to an integrating capacitor to obtain the desired direct or unidirectional voltage to power the equipment. As is known, transformers may be interposed between the power mains and the rectifiers in order to obtain galvanic or conductive isolation of the equipment from the mains, to provide a voltage transformation, or for other reasons.

Surges having a duration of a few microseconds to twenty or more microseconds, and having a potential of up to 5,000 volts have been observed on the power mains. Voltages of this magnitude substantially exceed the maximum reverse voltage which power-supply rectifiers are commonly designed to withstand. Since the maximum voltage which such surges are capable of reaching is unknown, it is impractical to use power-supply rectifiers having maximum reverse voltages capable of withstanding the surges. In the ordinary silicon rectifier, application of excessive reverse voltage for more than a short period of time allows an avalanche current to build up which may destroy the junction.

When the filter capacitor is coupled directly to the output of a bridge rectifier without the presence of an intervening impedance element, the maximum reverse voltage appearing across diodes of the rectifier cannot exceed the capacitor voltage. Since the capacitor voltage cannot change instantaneously, the diodes are protected against excessive reverse voltage surges.

Copending application Ser. No. 750,632 filed Dec. 15, 1976 now U.S. Pat. No. 4,127,875; issued Nov. 28, 1978 in the name of R. E. Fernsler, et al. describes a start-up circuit for a television receiver including a transformer having its primary winding coupled between the power-supply rectifier and the filter capacitor. The transformer winding introduces an impedance in the charging path of the filter capacitor which allows the surge voltage to appear across the back-biased diodes of the bridge rectifier, thereby exacerbating the problem of diode destruction due to excessive reverse voltage.

Copending application Ser. No. 901,232 filed Apr. 28, 1978 in the name of Robert Giger now abandoned describes a voltage controlled switch in the form of an ionization or glow lamp coupled across the transformer winding for limiting the reverse voltage across the diodes to the sum of the filter capacitor voltage and the offset voltage of the lamp.

The glow lamps have been found to have variable turn-on speed and voltage drop characteristics when operated in a dark environment such as the interior of the cabinet of a television receiver. It is desirable to have consistent turn-on speed and voltage drop characteristics for reliable protection of the rectifier diodes.

SUMMARY OF THE INVENTION

A direct voltage supply for a television receiver adapted to be energized from a source of alternating current upon which voltage surges of uncontrolled magnitude may appear and which is intended to be enclosed within a housing includes a full-wave rectifier coupled to the source of alternating current for producing a pulsating direct current. An impedance couples the output of the full-wave rectifier to a filter capacitor for generating a direct voltage from the pulsating direct current. An ionization device is coupled across the impedance for coupling to the capacitor those surges exceeding the offset potential of the device. The ionization device is coupled to the horizontal deflection circuit for ionizing the device independent of the surges.

DESCRIPTION OF THE INVENTION

Figure 1:
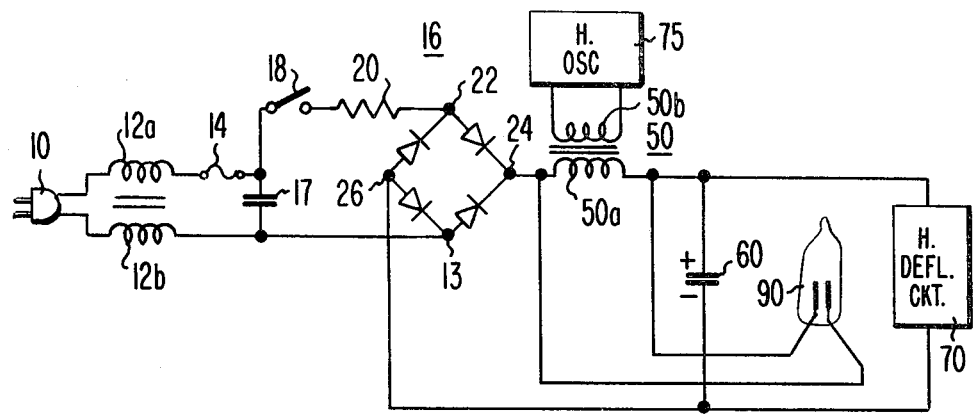
FIGS. 1 and 2 illustrate in block, schematic and semipictorial form direct voltage supplies for a television receiver embodying the invention.

In FIG. 1, a plug 10 carries two conductors adapted to be coupled to the power mains. One conductor of plug 10 is coupled by way of a radio-frequency interference (RFI) filter inductor 12b to a terminal 13 of a bridge rectifier designated generally as 16. The other conductor of plug 10 is coupled through an RFI filter inductor 12a and through a fuse 14 to one end of an RFI suppression capacitor 17, the other end of which is coupled to terminal 13. The junction of fuse 14 and capacitor 17 is coupled by means of an on-off switch 18 to a low-value current-limiting resistor 20. A terminal 22 of rectifier 16 is coupled to resistor 20. Thus, terminals 13 and 22 are effectively coupled to the power mains. Pulsating direct current is generated at terminals 24 and 26 of rectifier 16 and flows through the series path formed by a primary winding 50a of a transformer 50 and a filter capacitor 60. Capacitor 60 integrates the pulsating current to form an energizing voltage across its terminals of the polarity illustrated. A secondary winding 50b of transformer 50 is coupled to that portion of the television receiver requiring energization at turn-on. As illustrated, winding 50b is coupled to a horizontal oscillator 75. A horizontal deflection circuit illustrated as a block 70 is coupled across capacitor 60 for being energized by the voltage thereacross. A glow lamp illustrated as a neon bulb or lamp 90 has its leads connected across winding 50a and is physically in proximity to horizontal deflection circuit 70.

Figure 3:
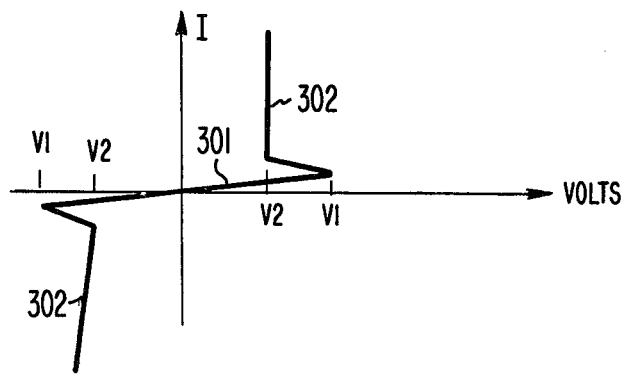
FIG. 3 is a voltage-current plot of the characteristic of a neon lamp.

Neon lamp 90 has a voltage-current characteristic illustrated in FIG. 3. As illustrated, the curve is symmetrical about the current (I) axis denoting conduction symmetry. With 0 volts across the lamp, it is ordinarily not ionized and presents a high resistance to the flow of current. Curve portion 301 represents the low current which flows in the lamp in its nonionized state. When the voltage applied across the terminals reaches a value such as V1, the gas in the lamp becomes ionized by the electric field across its electrodes and the voltage drops to a value illustrated as V2. With the lamp in the ionized state, it has a relatively low dynamic resistance and small increments of applied voltage result in relatively large increases in the current therethrough.

In normal operation of the arrangement of FIG. 1, a potential on the order of a few volts appears across winding 50a due to the flow of current from rectifier 16 to capacitor 60 to supply the requirements of horizontal deflection circuit 70. Horizontal deflection circuit 70 produces high-voltage radio-frequency (RF) pulses in the course of its operation. Such pulses may exceed 1,000 volts at a frequency of 15,750 Hz. The physical structure by which the deflection circuit generates the pulses is relatively large, and the electric fields in its vicinity are strong. With neon lamp 90 in physical proximity to deflection circuit 70, the neon gas within the envelope of the lamp is excited or ionized by the deflection current fields, as evidenced by a bright glow. This biases the lamp to region 302 of low dynamic impedance. No current flows through lamp 90, however, because the voltage applied across its terminals is less than offset voltage V2.

With lamp 90 ionized by the field produced by deflection circuit 70, surges incoming to the television receiver from the power mains and appearing across winding 50a need only exceed voltage V2 of FIG. 3 to cause lamp 90 to conduct and couple the surges to capacitor 60. If lamp 90 were not ionized by the deflection circuit field, the surge voltage would have to reach voltage V1 or possibly a greater voltage, depending upon the duration of the surge. Thus, the ionization of the lamps by the electric field of the deflection circuit reduces the magnitude of the surge appearing across the reverse-biased diodes of rectifier 16.

Figure 2:
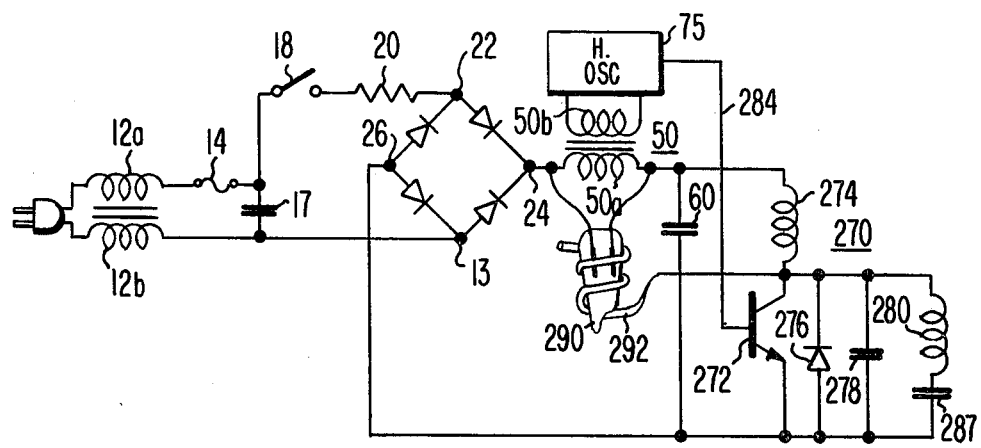

In FIG. 2, details of horizontal deflection circuit 70 are illustrated. Elements of FIG. 2 corresponding to those of FIG. 1 are designated by the same number. In FIG. 2, deflection circuit 270 coupled across filter capacitor 60 includes an NPN transistor having its collector-emitter path serially coupled with a winding 274. A damper diode 276 is coupled across the collector-emitter conducting path of transistor 272. A retrace capacitor 278 and the serial connection of a deflection winding 280 and S-shaping capacitor 287 are coupled across damper diode 276. A conductor 284 couples the output of horizontal oscillator 75 to the base of horizontal output transistor 272 for coupling horizontal drive pulses thereto.

A neon lamp 290 has its leads coupled across primary winding 50a for coupling surges appearing between terminals 24 and 26 to capacitor 60. Lamp 290 may be located conveniently at a distance from the high-power portions of horizontal deflection circuit 272. A conductor 292 has one end wrapped about the glass envelope of lamp 290 and the other end connected of the collector of transistor 272.

In normal operation, high-voltage retrace pulses appearing at the collector of transistor 272 are brought into close proximity of lamp 290 by lead 292. The radio-frequency pulses create an electric field within the envelope of lamp 290 which ionizes the gas. It is believed that the capacitance between conductor 292 and the electrodes of lamp 290 provides a path for the flow of current by which the power required to maintain the lamp ionized is supplied.

While the turns of conductor 292 around the envelope of lamp 290 provide reasonably sound mechanical coupling, it is only necessary for conductor 292 to be in the vicinity of the lamp in order to achieve ionization.

Those skilled in the art will recognize that the high-voltage radio frequency pulses may be obtained from other locations associated with the horizontal deflection apparatus.

What is claimed is:

1. A direct voltage supply for a television receiver adapted to be energized from a source of alternating current upon which voltage surges of uncontrolled magnitude may appear and which is intended to be enclosed within a housing, the voltage supply comprising:

full-wave rectifier means coupled to the source of alternating current for producing a pulsating direct current therefrom;

filter capacitor means;

impedance means coupling the output of said full-wave rectifier means to said filter capacitor means for coupling said pulsating direct current thereto for generating a direct voltage; and an ionization device coupled to the horizontal deflection circuit for being ionized thereby and coupled across said impedance means for coupling to said capacitor means those surges exceeding the offset potential of said device.

2. A supply according to claim 1 wherein said ionization device is proximity coupled to said horizontal deflection circuit for being ionized by the fields of said deflection circuit.

3. A supply according to claim 1 wherein said ionization device is coupled to said horizontal deflection circuit by a conductor.

4. A supply according to claim 3 wherein said conductor is proximity coupled to said ionization device and is connected to a point in said deflection circuit at which high-voltage radio-frequency signals appear.

5. A supply according to claims 1, 2, 3 or 4 wherein said ionization device is a neon lamp.

6. A supply according to claim 4 wherein said point in said deflection circuit is the collector of the horizontal output switch.

7. A supply according to claim 6 wherein said switch is a transistor.

8. A direct voltage supply for a television receiver adapted to be energized from a source of alternating current upon which voltage surges of uncontrolled magnitude may appear and which is intended to be enclosed within a housing, the voltage supply comprising:

full-wave rectifier means coupled to the source of alternating current for producing a pulsating direct current therefrom;

filter capacitor means;

impedance means coupling the output of said full-wave rectifier means to said filter capacitor means for coupling said pulsating direct current thereto for generating a direct voltage;

an ionization device coupled across said impedance means for coupling to said capacitor means those surges exceeding the offset potential of the device; and means coupling said ionization device to the horizontal deflection circuit for ionizing said device independent of said surges.

* * * * *